US012741380B2

(12) United States Patent
Hoelscher et al.

(10) Patent No.: US 12,741,380 B2
(45) Date of Patent: Sep. 22, 2026

(54) METHODS AND APPARATUSES FOR DROPPED OBJECT DETECTION

(71) Applicant: Boston Dynamics, Inc., Waltham, MA (US)

(72) Inventors: Andrew Hoelscher, Somerville, MA (US); Samuel Shaw, Somerville, MA (US); Alexander Ozer, Somerville, MA (US); Jennifer Barry, Arlington, MA (US); Matthew Turpin, Newton, MA (US)

(73) Assignee: Boston Dynamics, Inc., Waltham, MA (US)

( * ) Notice: Subject to any disclaimer, the term of this patent is extended or adjusted under 35 U.S.C. 154(b) by 210 days.

(21) Appl. No.: 17/987,513

(22) Filed: Nov. 15, 2022

(65) Prior Publication Data

US 2023/0182314 A1 Jun. 15, 2023

Related U.S. Application Data

(60) Provisional application No. 63/288,298, filed on Dec. 10, 2021.

(51) Int. Cl.
*B25J 9/16* (2006.01)
*B25J 19/02* (2006.01)
(Continued)

(52) U.S. Cl.
CPC ........... *B25J 9/1697* (2013.01); *B25J 9/1669* (2013.01); *B25J 19/023* (2013.01); *G06T 7/187* (2017.01);
(Continued)

(58) Field of Classification Search
CPC ........ B25J 9/162; B25J 9/1669; B25J 9/1697; B25J 19/023; G05B 2219/37281;
(Continued)

(56) References Cited

U.S. PATENT DOCUMENTS

2013/0310982 A1* 11/2013 Scheurer .................. B25J 5/007 700/263
2015/0352721 A1* 12/2015 Wicks .................... G06V 20/10 700/228
(Continued)

FOREIGN PATENT DOCUMENTS

EP 3311960 A1 4/2018
EP 3584042 A2 12/2019
WO 2015187975 A1 12/2015

OTHER PUBLICATIONS

International Search Report and Written Opinion of the International Searching Authority for International Application No. PCT/US2022/049953, dated Feb. 21, 2023.
(Continued)

*Primary Examiner* — Blake A Wood
(74) *Attorney, Agent, or Firm* — Pierce Atwood LLP

(57) ABSTRACT

Methods and apparatuses for detecting one or more objects (e.g., dropped objects) by a robotic device are described. The method comprises receiving a distance-based point cloud including a plurality of points in three dimensions, filtering the distance-based point cloud to remove points from the plurality of points based on at least one known surface in an environment of the robotic device to produce a filtered distance-based point cloud, clustering points in the filtered distance-based point cloud to produce a set of point clusters, and detecting one or more objects based, at least in part, on the set of point clusters.

23 Claims, 10 Drawing Sheets

(51) Int. Cl.
*G06T 7/187* (2017.01)
*G06V 10/26* (2022.01)
*G06V 10/762* (2022.01)

(52) U.S. Cl.
CPC .......... *G06V 10/267* (2022.01); *G06V 10/762* (2022.01); *G06T 2207/10028* (2013.01); *G06T 2207/20024* (2013.01)

(58) Field of Classification Search
CPC ........... G05B 2219/37425; G05B 2219/40006; G05B 2219/40548; G05B 2219/40594; G06F 18/23; G06T 7/11; G06T 7/136; G06T 7/187; G06T 2207/10028; G06T 2207/20024; G06V 10/267; G06V 10/762; G06V 20/64
See application file for complete search history.

(56) References Cited

U.S. PATENT DOCUMENTS

| | | | | |
|---|---|---|---|---|
| 2018/0086575 | A1* | 3/2018 | McCarthy ............ | B65G 41/002 |
| 2018/0111765 | A1 | 4/2018 | Wicks et al. | |
| 2018/0111769 | A1* | 4/2018 | Yuvaraj .................. | B25J 9/1687 |
| 2019/0366542 | A1* | 12/2019 | Ben-David .......... | G05D 1/0238 |
| 2020/0202544 | A1* | 6/2020 | Barish ....................... | G06T 7/55 |

OTHER PUBLICATIONS

Czetina, et al., “Robot Assisted Analysis of Suspicious Objects in Public Spaces Using CBRN Sensors in Combination With High-Resolution LIDAR,” 2019, IEEE/International Symposium on Safety, Security, and Rescue Robotics (SSRR), Wurzburg, Germany, Sep. 2-4, 2019.

International Preliminary Report on Patentability and Written Opinion from the International Bureau for Application No. PCT/US2022/049953, dated Jun. 20, 2024, 9 pages.

* cited by examiner

METHODS AND APPARATUSES FOR DROPPED OBJECT DETECTION

CROSS REFERENCE TO RELATED APPLICATIONS

This application claims the benefit under 35 U.S.C. § 119 (e) of U.S. Provisional application Ser. No. 63/288,298, filed Dec. 10, 2021, and entitled, "METHODS AND APPARATUSES FOR DROPPED OBJECT DETECTION," the disclosure of which is incorporated by reference in its entirety.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction-based mechanisms), or some combination of a manipulator and a mobile robot. Robots are utilized in a variety of industries including, for example, manufacturing, warehouse logistics, transportation, hazardous environments, exploration, and healthcare.

SUMMARY

Robots configured to grasp objects (e.g., boxes) in their environment occasionally drop those objects if, for example, a sufficient grip force is not applied to the object by the robot, or the object collides with an obstruction during movement of the object. Additionally, removing an object from a stack of objects may, in some instances, cause at least a portion of the stack of objects to fall to the ground. Other objects may fall to the ground due to other reasons. For instance, an object placed on a surface such as a conveyor may fall off inadvertently due to poor placement on the conveyor or for some other reason. Regardless of the reason an object in the environment of a robot has fallen to the ground, such objects may not be observable by a perception system (e.g., one or more cameras) of the robot. For instance, if the object is located behind or to the side of the robot, a perception system of the robot may not have a field of view that includes the dropped object.

The inventors have recognized and appreciated that failing to detect and grasp objects that have fallen to the ground may result in the robot driving over or otherwise damaging the dropped objects. Some conventional techniques for identifying dropped objects involve a person identifying such objects and cleaning up any stray objects that may have been dropped after a robot has completed its task, which is inefficient and increases the total amount of time a person needs to tend to the robot. To this end, some embodiments of the invention are directed to techniques for identifying and picking up objects located near the robot that may have dropped to the ground.

One aspect of the disclosure provides a method of detecting one or more objects by a robotic device. The method comprises receiving, by at least one computing device, a distance-based point cloud including a plurality of points in three dimensions, filtering, by the at least one computing device, the distance-based point cloud to remove points from the plurality of points based on at least one known surface in an environment of the robotic device to produce a filtered distance-based point cloud, clustering, by the at least one computing device, points in the filtered distance-based point cloud to produce a set of point clusters, and detecting, by the at least one computing device, one or more objects based, at least in part, on the set of point clusters.

In another aspect, the distance-based point cloud includes points in the environment of the robotic device that surround the robotic device.

In another aspect, the distance-based point cloud includes data captured using at least one LIDAR sensor.

In another aspect, the at least one known surface includes a wall of an enclosure in the environment of the robotic device.

In another aspect, the at least one known surface includes a surface corresponding to a stack of objects arranged near the robotic device.

In another aspect, the at least one known surface includes a surface associated with an accessory located near and/or coupled to the robotic device. The accessory may comprise a conveyor onto which the robotic device is configured to place objects.

In another aspect, the at least one known surface comprises a wall of an enclosure in the environment of the robotic device, a surface corresponding to a stack of objects arranged near the robotic device, and a surface associated with a conveyor on which the robotic device is configured to place objects.

In another aspect, clustering points in the filtered distance-based point cloud to produce a set of point clusters comprises using a region growing technique to cluster points in the filtered distance-based point cloud.

In another aspect, the region growing technique determines that points in the filtered distance-based point cloud should be formed into a cluster when the points are less than a threshold distance from each other.

In another aspect, detecting one or more objects based, at least in part, on the set of point clusters comprises for each point cluster in the set of point clusters determining at least one characteristic of the point cluster, and determining that the point cluster represents an object of the one or more objects when the at least one characteristic is associated with one or more known objects in an environment of the robotic device.

In another aspect, the at least one characteristic includes one or more of a dimension of the point cluster, a number of points in the point cluster, or a shape of the point cluster.

In another aspect, the at least one characteristic includes multiple characteristics including two or more of a dimension of the point cluster, a number of points in the point cluster, or a shape of the point cluster.

In another aspect, the one or more known objects in an environment of the robotic device includes rectangular boxes and wherein the point cluster is determined to be the one or more objects when the shape of the point cluster is rectangular or approximately rectangular.

In another aspect, the method further comprises removing a point cluster from the set of point clusters when it is determined that the at least one characteristic is not associated with one or more known objects in the environment of the robotic device.

In another aspect, the method further comprises removing a point cluster from the set of point clusters when it is determined that a number of points in the point cluster is less than a threshold amount.

In another aspect, the robotic device is configured to repeatedly grasp objects from a stack of objects, and wherein the one or more objects are detected without interrupting the repeated grasping operation of the robotic device.

In another aspect, the one or more objects are detected without observing the dropped object with a camera.

In another aspect, the method further comprises controlling the robotic device to grasp the detected one or more objects.

In another aspect, the method further comprises controlling the robotic device to drive to a location where the detected one or more objects are within a field of view of a perception module of the robotic device, controlling the perception module of the robotic device to capture at least one image of the detected one or more objects, and controlling the robotic device to grasp the detected one or more objects based on the captured at least one image of the detected one or more objects.

In another aspect, controlling the robotic device to drive to a location where the detected one or more objects are within a field of view of a perception module of the robotic device comprises controlling the robotic device to drive away from a stack of objects that the robotic device is configured to interact with until the detected one or more objects are within the field of view of the perception module.

One aspect of the disclosure provides a mobile robotic device. The mobile robotic device comprises at least one distance sensor arranged on a base of the mobile robot, wherein the at least one distance sensor is configured to collect a distance-based point cloud including a plurality of points in three dimensions, at least one storage device configured to store information about at least one known surface in an environment of the robotic device, and at least one computing device. The at least one computing device is configured to filter the distance-based point cloud to remove points from the plurality of points based on the information about the at least one known surface to produce a filtered distance-based point cloud, cluster points in the filtered distance-based point cloud to produce a set of point clusters, and detect one or more objects based, at least in part, on the set of point clusters.

In another aspect, the at least one distance sensor comprises a plurality of distance sensors, each distance sensor of the plurality of distance sensors arranged on a different side of the base of the robotic device, and wherein the distance-based point cloud includes points in the environment of the robotic device that surround the robotic device.

In another aspect, the at least one distance sensor comprises at least one LIDAR sensor configured to detect a distance to an object in the environment of the robotic device.

In another aspect, the mobile robotic device, further comprises an end effector configured to repeatedly grasp objects from a stack of objects located near the robotic device, wherein the one or more objects are detected without interrupting the repeated grasping operation of the robotic device.

In another aspect, the mobile robotic device further comprises a perception module configured to capture one or more images of the environment of the robotic device, and wherein the one or more objects are detected without observing the one or more objects using the perception module.

In another aspect, the mobile robotic device further comprises an end effector configured to grasp objects in the environment of the robotic device, and wherein the at least one computing device is further configured to control the end effector to grasp at least one of the detected one or more objects.

In another aspect, the mobile robotic device further comprises a perception module configured to capture one or more images of the environment of the robotic device, and an omnidirectional drive system, wherein the at least one computing device is further configured to control the omnidirectional drive system to drive the robotic device to a location where the detected one or more objects are within a field of view of the perception module of the robotic device.

In another aspect, the at least one computing device is further configured to control the perception module of the robotic device to capture at least one image of the detected one or more objects, and control the end effector of the robotic device to grasp the detected one or more objects based on the captured at least one image of the detected one or more objects.

In another aspect, controlling the omnidirectional drive system of the robotic device to drive to a location where the detected one or more objects is within a field of view of a perception module of the robotic device comprises controlling the robotic device to drive away from a stack of objects that the robotic device is configured to interact with until the detected one or more objects is within the field of view of the perception module.

One aspect of the disclosure provides a non-transitory computer-readable medium encoded with a plurality of instructions that, when executed by at least one computing device, perform a method. The method comprises receiving a distance-based point cloud including a plurality of points in three dimensions, filtering the distance-based point cloud to remove points from the plurality of points based on at least one known surface in an environment of the robotic device to produce a filtered distance-based point cloud, clustering points in the filtered distance-based point cloud to produce a set of point clusters, and detecting one or more objects based, at least in part, on the set of point clusters.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
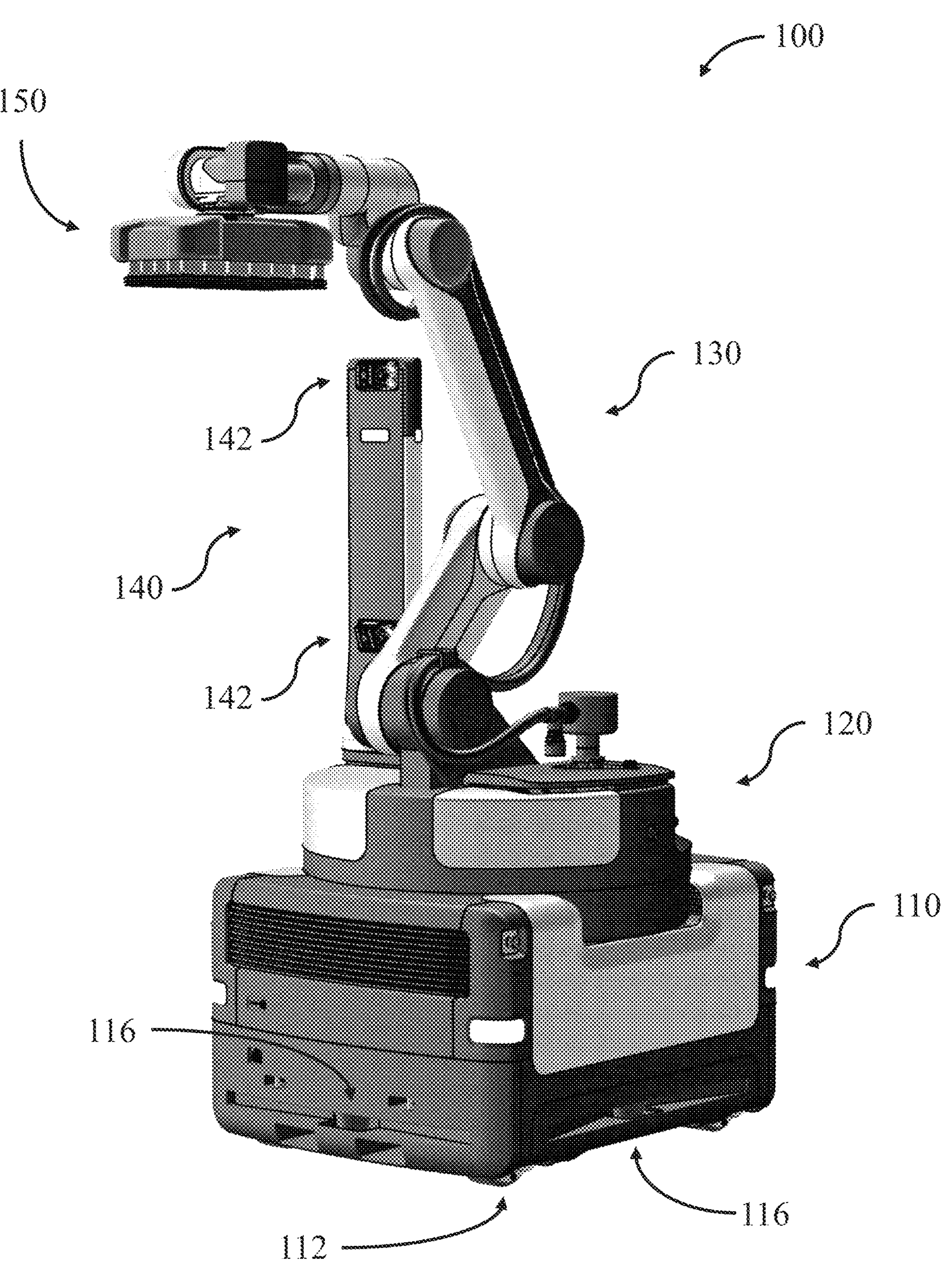
FIG. 1A is a perspective view of one embodiment of a robot.

Robots (also referred to herein as "robotic devices") are typically configured to perform various tasks in an environment in which they are placed. Generally, these tasks include interacting with objects and/or the elements of the environment. Notably, robots are becoming popular in warehouse and logistics operations. Before the introduction of robots to such spaces, many operations were performed manually. For example, a person might manually unload boxes from a truck onto one end of a conveyor belt, and a second person at the opposite end of the conveyor belt might organize those boxes onto a pallet. The pallet may then be picked up by a forklift operated by a third person, who might drive to a storage area of the warehouse and drop the pallet for a fourth person to remove the individual boxes from the pallet and place them on shelves in the storage area. More recently, robotic solutions have been developed to automate many of these functions. Such robots may either be specialist robots (i.e., designed to perform a single task, or a small number of closely related tasks) or generalist robots (i.e., designed to perform a wide variety of tasks). To date, both specialist and generalist warehouse robots have been associated with significant limitations, as explained below.

A specialist robot may be designed to perform a single task, such as unloading boxes from a truck onto a conveyor belt. While such specialist robots may be efficient at performing their designated task, they may be unable to perform other, tangentially related tasks in any capacity. As such, either a person or a separate robot (e.g., another specialist robot designed for a different task) may be needed to perform the next task(s) in the sequence. As such, a warehouse may need to invest in multiple specialist robots to perform a sequence of tasks, or may need to rely on a hybrid operation in which there are frequent robot-to-human or human-to-robot handoffs of objects.

In contrast, a generalist robot may be designed to perform a wide variety of tasks, and may be able to take a box through a large portion of the box's life cycle from the truck to the shelf (e.g., unloading, palletizing, transporting, depalletizing, storing). While such generalist robots may perform a variety of tasks, they may be unable to perform individual tasks with high enough efficiency or accuracy to warrant introduction into a highly streamlined warehouse operation. For example, while mounting an off-the-shelf robotic manipulator onto an off-the-shelf mobile robot might yield a system that could, in theory, accomplish many warehouse tasks, such a loosely integrated system may be incapable of performing complex or dynamic motions that require coordination between the manipulator and the mobile base, resulting in a combined system that is inefficient and inflexible. Typical operation of such a system within a warehouse environment may include the mobile base and the manipulator operating sequentially and (partially or entirely) independently of each other. For example, the mobile base may first drive toward a stack of boxes with the manipulator powered down. Upon reaching the stack of boxes, the mobile base may come to a stop, and the manipulator may power up and begin manipulating the boxes as the base remains stationary. After the manipulation task is completed, the manipulator may again power down, and the mobile base may drive to another destination to perform the next task. As should be appreciated from the foregoing, the mobile base and the manipulator in such systems are effectively two separate robots that have been joined together; accordingly, a controller associated with the manipulator may not be configured to share information with, pass commands to, or receive commands from a separate controller associated with the mobile base. As such, such a poorly integrated mobile manipulator robot may be forced to operate both its manipulator and its base at suboptimal speeds or through suboptimal trajectories, as the two separate controllers struggle to work together. Additionally, while there are limitations that arise from a purely engineering perspective, there are additional limitations that must be imposed to comply with safety regulations. For instance, if a safety regulation requires that a mobile manipulator must be able to be completely shut down within a certain period of time when a human enters a region within a certain distance of the robot, a loosely integrated mobile manipulator robot may not be able to act sufficiently quickly to ensure that both the manipulator and the mobile base (individually and in aggregate) do not a pose a threat to the human. To ensure that such loosely integrated systems operate within required safety constraints, such systems are forced to operate at even slower speeds or to execute even more conservative trajectories than those limited speeds and trajectories as already imposed by the engineering problem. As such, the speed and efficiency of generalist robots performing tasks in warehouse environments to date have been limited.

In view of the above, the inventors have recognized and appreciated that a highly integrated mobile manipulator robot with system-level mechanical design and holistic control strategies between the manipulator and the mobile base may be associated with certain benefits in warehouse and/or logistics operations. Such an integrated mobile manipulator robot may be able to perform complex and/or dynamic motions that are unable to be achieved by conventional, loosely integrated mobile manipulator systems. As a result, this type of robot may be well suited to perform a variety of different tasks (e.g., within a warehouse environment) with speed, agility, and efficiency.

Example Robot Overview

In this section, an overview of some components of one embodiment of a highly integrated mobile manipulator robot configured to perform a variety of tasks is provided to explain the interactions and interdependencies of various subsystems of the robot. Each of the various subsystems, as well as control strategies for operating the subsystems, are described in further detail in the following sections.

Figure 1B:
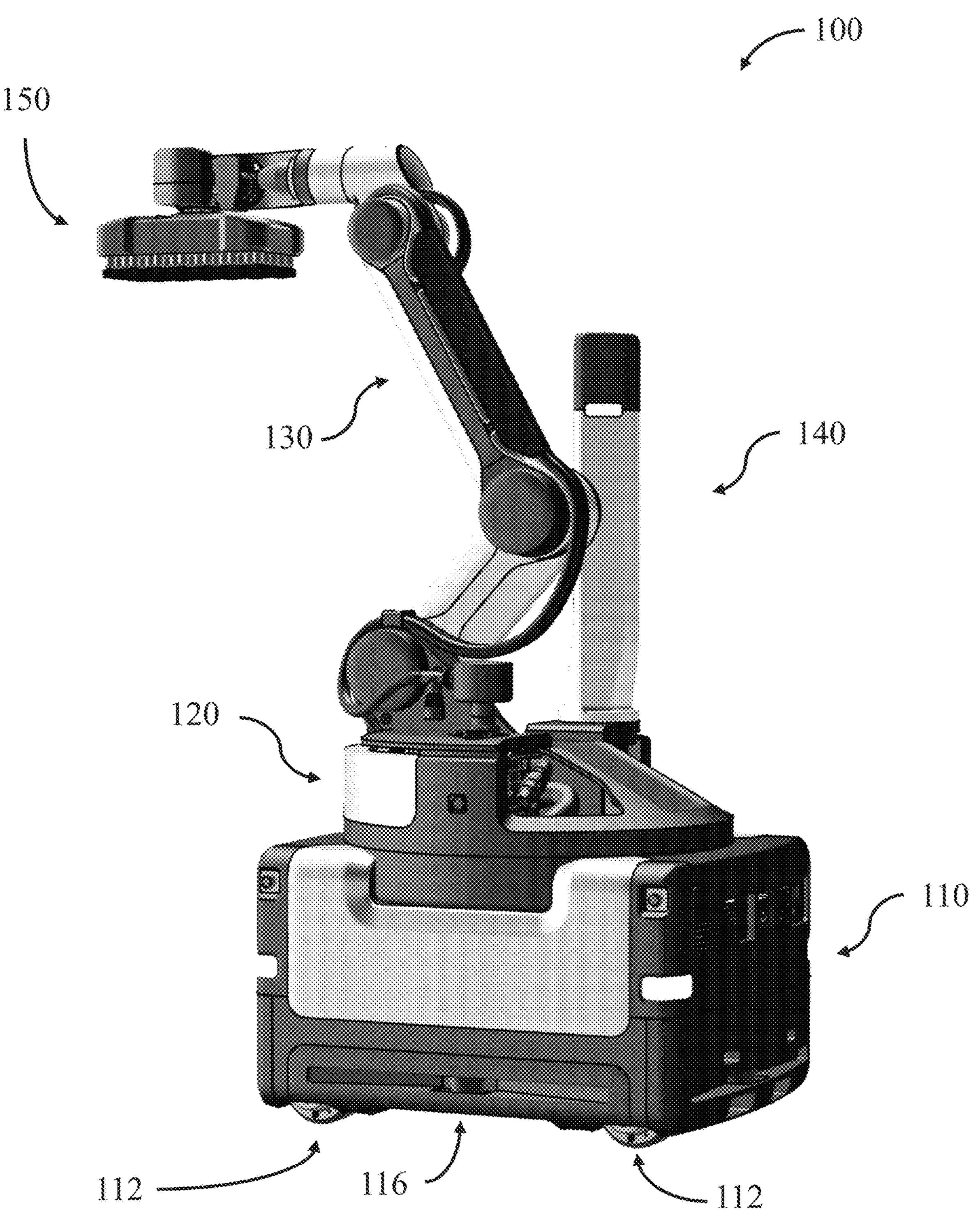
FIG. 1B is another perspective view of the robot of FIG. 1A.

FIGS. 1A and 1B are perspective views of one embodiment of a robot 100. The robot 100 includes a mobile base 110 and a robotic arm 130. The mobile base 110 includes an omnidirectional drive system that enables the mobile base to translate in any direction within a horizontal plane as well as rotate about a vertical axis perpendicular to the plane. Each wheel 112 of the mobile base 110 is independently steerable and independently drivable. The mobile base 110 additionally includes a number of distance sensors 116 that assist the robot 100 in safely moving about its environment. The robotic arm 130 is a 6 degree of freedom (6-DOF) robotic arm including three pitch joints and a 3-DOF wrist. An end effector 150 is disposed at the distal end of the robotic arm

130. The robotic arm 130 is operatively coupled to the mobile base 110 via a turntable 120, which is configured to rotate relative to the mobile base 110. In addition to the robotic arm 130, a perception mast 140 is also coupled to the turntable 120, such that rotation of the turntable 120 relative to the mobile base 110 rotates both the robotic arm 130 and the perception mast 140. The robotic arm 130 is kinematically constrained to avoid collision with the perception mast 140. The perception mast 140 is additionally configured to rotate relative to the turntable 120, and includes a number of perception modules 142 configured to gather information about one or more objects in the robot's environment. The integrated structure and system-level design of the robot 100 enable fast and efficient operation in a number of different applications, some of which are provided below as examples.

Figure 2A:
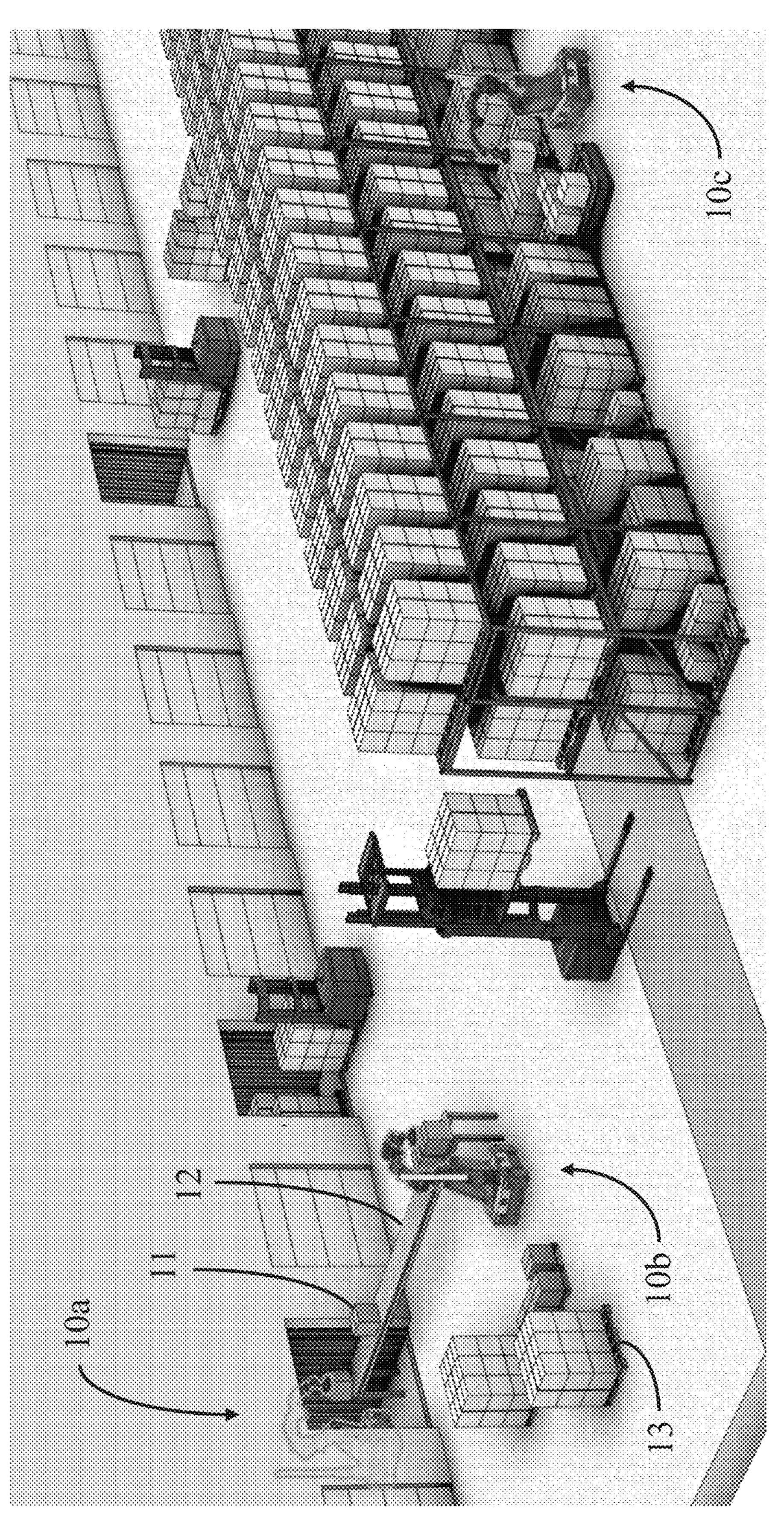
FIG. 2A depicts robots performing tasks in a warehouse environment.

FIG. 2A depicts robots 10*a*, 10*b*, and 10*c* performing different tasks within a warehouse environment. A first robot 10*a* is inside a truck (or a container), moving boxes 11 from a stack within the truck onto a conveyor belt 12 (this particular task will be discussed in greater detail below in reference to FIG. 2B). At the opposite end of the conveyor belt 12, a second robot 10*b* organizes the boxes 11 onto a pallet 13. In a separate area of the warehouse, a third robot 10*c* picks boxes from shelving to build an order on a pallet (this particular task will be discussed in greater detail below in reference to FIG. 2C). It should be appreciated that the robots 10*a*, 10*b*, and 10*c* are different instances of the same robot (or of highly similar robots). Accordingly, the robots described herein may be understood as specialized multi-purpose robots, in that they are designed to perform specific tasks accurately and efficiently, but are not limited to only one or a small number of specific tasks.

Figure 2B:
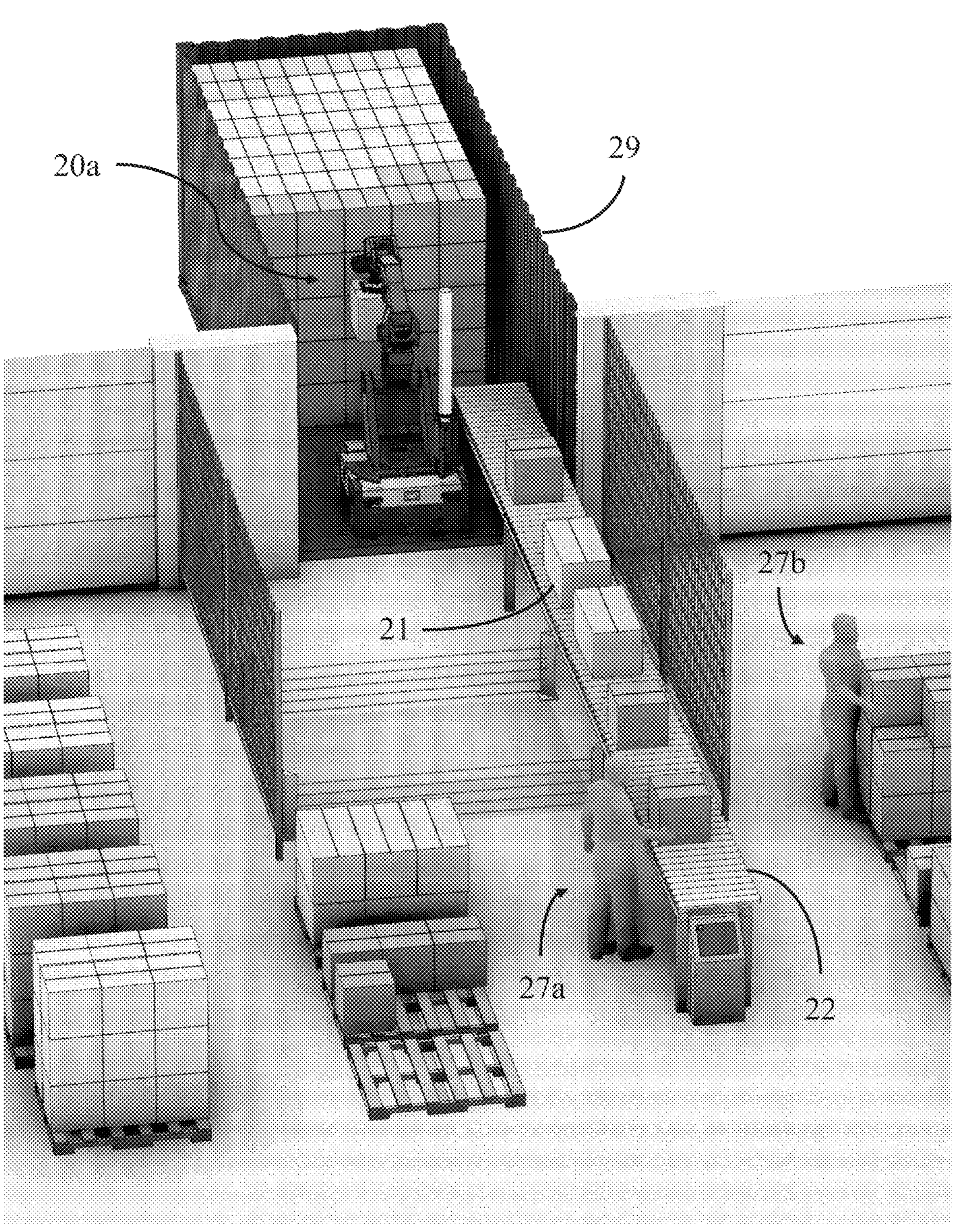
FIG. 2B depicts a robot unloading boxes from a truck.

FIG. 2B depicts a robot 20*a* unloading boxes 21 from a truck 29 and placing them on a conveyor belt 22. In this box picking application (as well as in other box picking applications), the robot 20*a* will repetitiously pick a box, rotate, place the box, and rotate back to pick the next box. Although robot 20*a* of FIG. 2B is a different embodiment from robot 100 of FIGS. 1A and 1B, referring to the components of robot 100 identified in FIGS. 1A and 1B will ease explanation of the operation of the robot 20*a* in FIG. 2B. During operation, the perception mast of robot 20*a* (analogous to the perception mast 140 of robot 100 of FIGS. 1A and 1B) may be configured to rotate independent of rotation of the turntable (analogous to the turntable 120) on which it is mounted to enable the perception modules (akin to perception modules 142) mounted on the perception mast to capture images of the environment that enable the robot 20*a* to plan its next movement while simultaneously executing a current movement. For example, while the robot 20*a* is picking a first box from the stack of boxes in the truck 29, the perception modules on the perception mast may point at and gather information about the location where the first box is to be placed (e.g., the conveyor belt 22). Then, after the turntable rotates and while the robot 20*a* is placing the first box on the conveyor belt, the perception mast may rotate (relative to the turntable) such that the perception modules on the perception mast point at the stack of boxes and gather information about the stack of boxes, which is used to determine the second box to be picked. As the turntable rotates back to allow the robot to pick the second box, the perception mast may gather updated information about the area surrounding the conveyor belt. In this way, the robot 20*a* may parallelize tasks which may otherwise have been performed sequentially, thus enabling faster and more efficient operation.

Also of note in FIG. 2B is that the robot 20*a* is working alongside humans (e.g., workers 27*a* and 27*b*). Given that the robot 20*a* is configured to perform many tasks that have traditionally been performed by humans, the robot 20*a* is designed to have a small footprint, both to enable access to areas designed to be accessed by humans, and to minimize the size of a safety zone around the robot into which humans are prevented from entering.

Figure 2C:
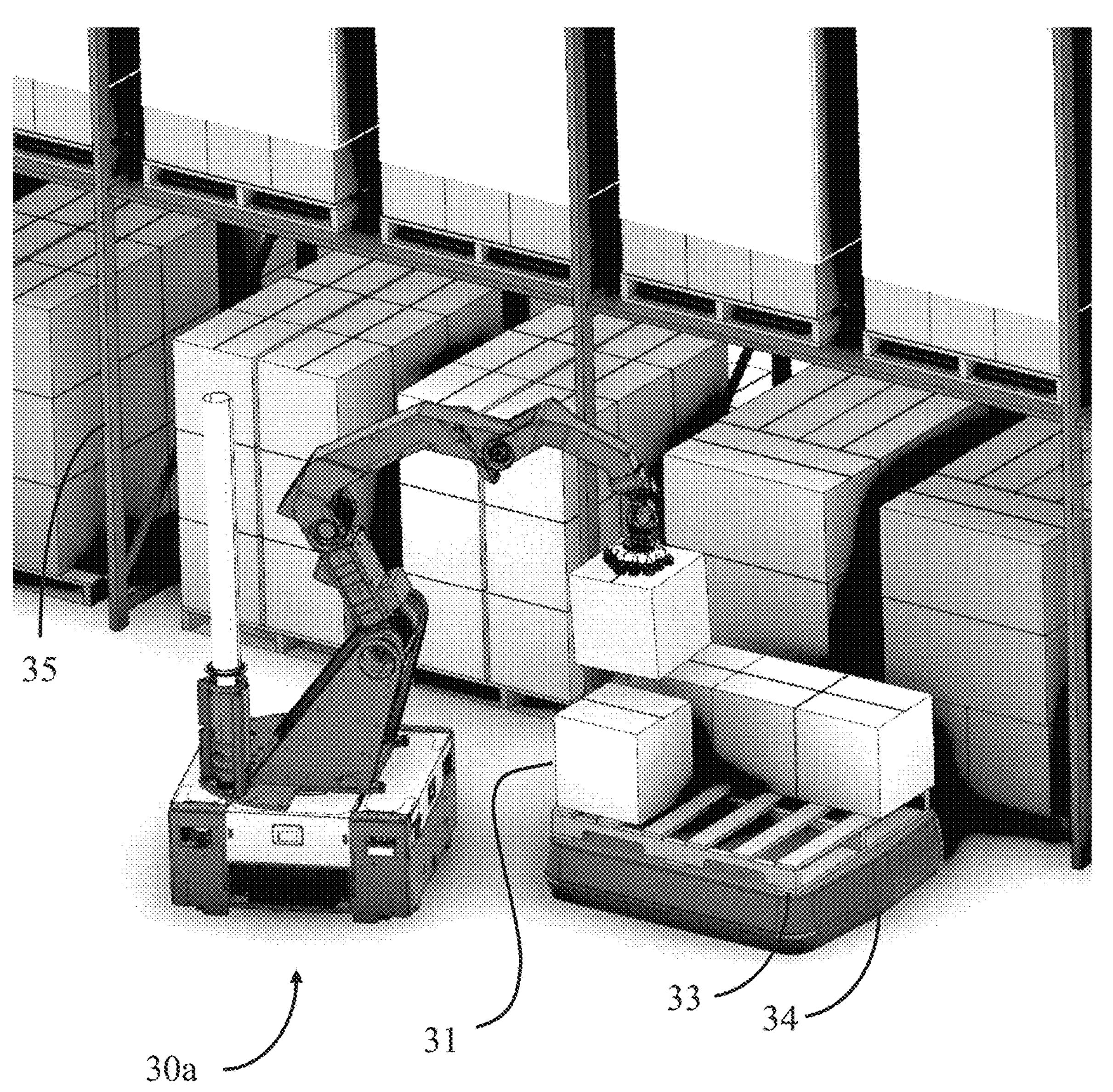
FIG. 2C depicts a robot building a pallet in a warehouse aisle.

FIG. 2C depicts a robot 30*a* performing an order building task, in which the robot 30*a* places boxes 31 onto a pallet 33. In FIG. 2C, the pallet 33 is disposed on top of an autonomous mobile robot (AMR) 34, but it should be appreciated that the capabilities of the robot 30*a* described in this example apply to building pallets not associated with an AMR. In this task, the robot 30*a* picks boxes 31 disposed above, below, or within shelving 35 of the warehouse and places the boxes on the pallet 33. Certain box positions and orientations relative to the shelving may suggest different box picking strategies. For example, a box located on a low shelf may simply be picked by the robot by grasping a top surface of the box with the end effector of the robotic arm (thereby executing a "top pick"). However, if the box to be picked is on top of a stack of boxes, and there is limited clearance between the top of the box and the bottom of a horizontal divider of the shelving, the robot may opt to pick the box by grasping a side surface (thereby executing a "face pick").

To pick some boxes within a constrained environment, the robot may need to carefully adjust the orientation of its arm to avoid contacting other boxes or the surrounding shelving. For example, in a typical "keyhole problem", the robot may only be able to access a target box by navigating its arm through a small space or confined area (akin to a keyhole) defined by other boxes or the surrounding shelving. In such scenarios, coordination between the mobile base and the arm of the robot may be beneficial. For instance, being able to translate the base in any direction allows the robot to position itself as close as possible to the shelving, effectively extending the length of its arm (compared to conventional robots without omnidirectional drive which may be unable to navigate arbitrarily close to the shelving). Additionally, being able to translate the base backwards allows the robot to withdraw its arm from the shelving after picking the box without having to adjust joint angles (or minimizing the degree to which joint angles are adjusted), thereby enabling a simple solution to many keyhole problems.

Of course, it should be appreciated that the tasks depicted in FIGS. 2A-2C are but a few examples of applications in which an integrated mobile manipulator robot may be used, and the present disclosure is not limited to robots configured to perform only these specific tasks. For example, the robots described herein may be suited to perform tasks including, but not limited to, removing objects from a truck or container, placing objects on a conveyor belt, removing objects from a conveyor belt, organizing objects into a stack, organizing objects on a pallet, placing objects on a shelf, organizing objects on a shelf, removing objects from a shelf, picking objects from the top (e.g., performing a "top pick"), picking objects from a side (e.g., performing a "face pick"), coordinating with other mobile manipulator robots, coordinating with other warehouse robots (e.g., coordinating with AMRs), coordinating with humans, and many other tasks.

In some embodiments, a mobile base may include sensors to help the mobile base navigate its environment. These sensors (and/or other sensors associated with the robotic arm, or another portion of the robot) may also allow the robot to detect potential safety concerns, such as a human approaching the robot while the robot is operating at high speeds. In the embodiment shown in FIGS. 1A and 1B, the mobile base 110 of the robot 100 includes distance sensors 116. The mobile base includes at least one distance sensor 116 on each side of the mobile base 110. A distance sensor may include a camera, a time of flight sensor, a LiDAR sensor, or any other sensor configured to sense information about the environment from a distance.

Some types of sensors (e.g., cameras, LiDAR sensors) may sense a region within a field of view of the sensor. A field of view may be associated with an angular value and/or a distance, or a field of view may be associated with a sector of a circle. In some embodiments of a mobile manipulator robot, the fields of view of the distance sensors may at least partially overlap. That is, a first field of view for a first distance sensor may at least partially overlap a second field of view for a second distance sensor. In this way, the effective field of view of multiple distance sensors may be greater than the field of view achievable with a single distance sensor, enabling greater visibility of the robot's environment. It should be appreciated that the present disclosure is not limited to any specific arrangement of distance sensors and/or degree of overlap between different fields of view. In some embodiments, a field of view of each distance sensor may at least partially overlap with a field of view of at least one other distance sensor. In some embodiments, a field of view of each distance sensor may at least partially overlap with a field of view of at least two other distance sensors.

Figure 2D:
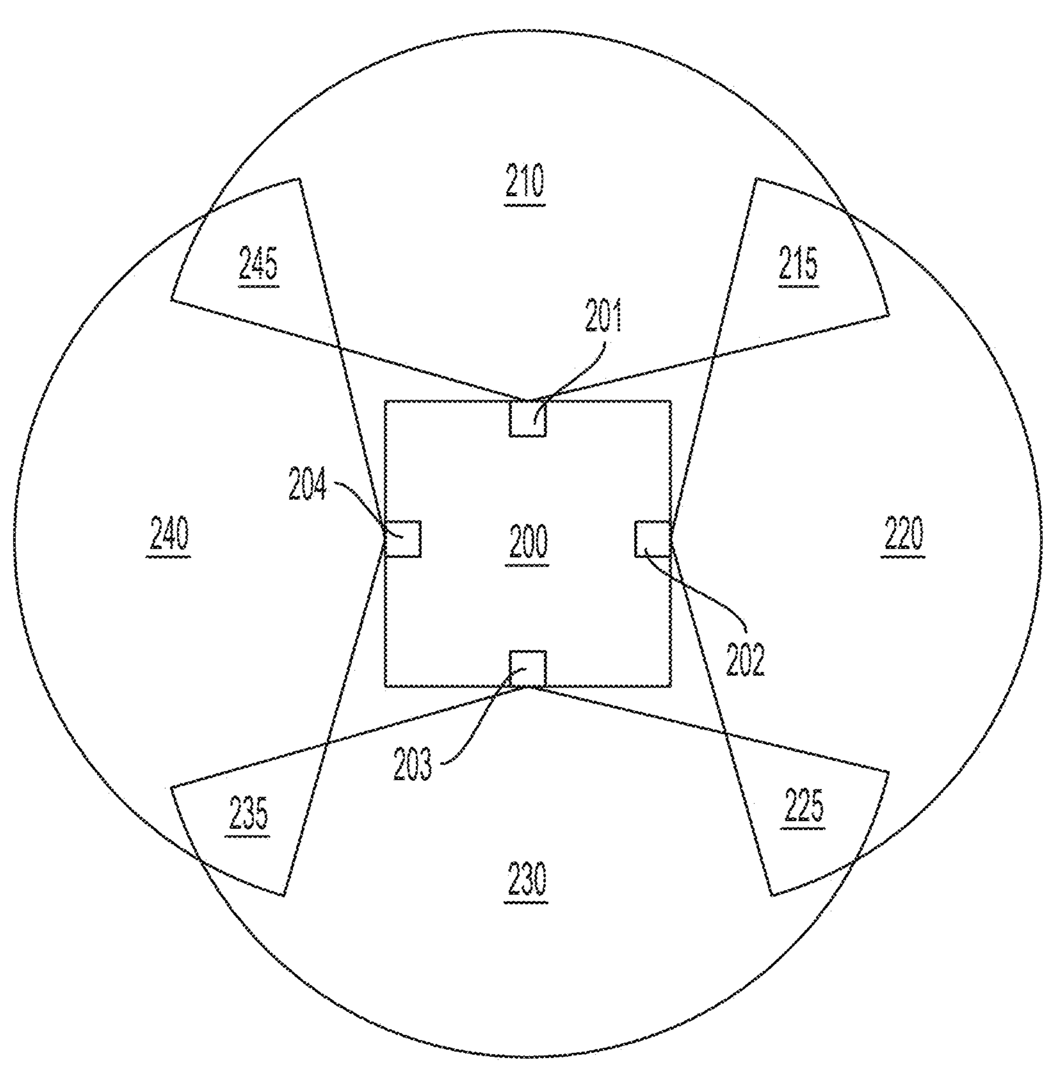
FIG. 2D is a top schematic view of one embodiment of overlapping fields of view of distance sensors of a robot.

The locations of the distance sensors and the associated fields of view may be arranged such that the field of view of each distance sensor at least partially overlaps the fields of view of the two neighboring distance sensors. In some embodiments, distance sensor fields of view may overlap continuously to provide a full 360-degree view of the environment around the robot. That is, in some embodiments, a combined field of view that includes the fields of view from all of the distance sensors is a 360-degree field of view. FIG. 2D depicts one embodiment of a mobile base 200 (e.g., a mobile base of an integrated mobile manipulator robot) with four sides (specifically, mobile base 200 is rectangular). A distance sensor is disposed on each of the four sides of the mobile base 200. Specifically, a first distance sensor 201 associated with a first field of view 210 is disposed on a first side of the mobile base, a second distance sensor 202 associated with a second field of view 220 is disposed on a second side of the mobile base, a third distance sensor 203 associated with a third field of view 230 is disposed on a third side of the mobile base, and a fourth distance sensor 204 associated with a fourth field of view 240 is disposed on a fourth side of the mobile base. The first field of view 210 overlaps the second field of view 220 in region 215, the second field of view 220 overlaps the third field of view 230 in region 225, the third field of view 230 overlaps the fourth field of view 240 in region 235, and the fourth field of view 240 overlaps the first field of view 210 in region 245. Accordingly, the first field of view 210 at least partially overlaps the second and fourth fields of view 220 and 240, and the third field of view 230 also at least partially overlaps the second and fourth fields of view 220 and 240. Additionally, the first and third fields of view 210 and 230 do not overlap (in the embodiment of FIG. 2D).

Example Computing Device

Control of one or more of the robotic arm, the mobile base, the turntable, and the perception mast may be accomplished using one or more computing devices located onboard the mobile manipulator robot. For instance, one or more computing devices may be located within a portion of the mobile base with connections extending between the one or more computing devices and components of the robot that provide sensing capabilities and components of the robot to be controlled. In some embodiments, the one or more computing devices may be coupled to dedicated hardware configured to send control signals to particular components of the robot to effectuate operation of the various robot systems. In some embodiments, the mobile manipulator robot may include a dedicated safety-rated computing device configured to integrate with safety systems that ensure safe operation of the robot.

The computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the terms "physical processor" or "computer processor" generally refer to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Figure 3:
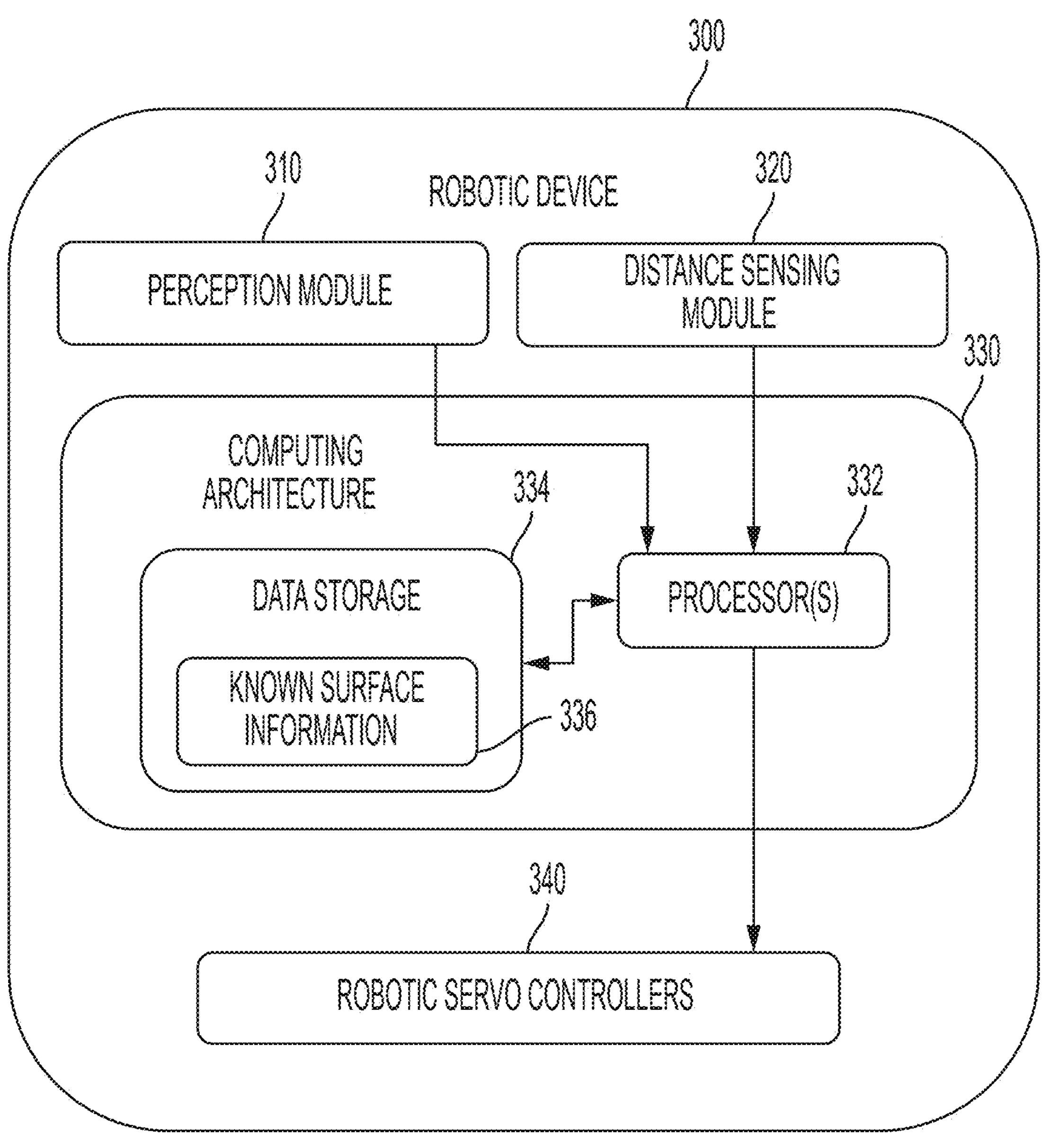
FIG. 3 is an illustrative computing architecture for a robotic device that may be used in accordance with some embodiments.

FIG. 3 illustrates an example computing architecture 310 for a robotic device 300, according to an illustrative embodiment of the invention. The computing architecture 310 includes one or more processors 332 and data storage 334 in communication with processor(s) 332. Robotic device 300 may also include a perception module 310 (which may include, e.g., the perception mast 140 shown and described above in FIGS. 1A-1B) and a distance sensing module 320 (e.g., a LiDAR system) arranged, for example, in the mobile base of the robot, as described in more detail below. The distance sensing module 320 may be configured to aid in locomotion of the mobile robotic device by, for example, detection of obstructions in the path of the robot to facilitate navigation. It should be appreciated that the perception module 310 and the distance sensing module 320 may be implemented as distinct units or may be integrated into a single unit. One or both of perception module 310 and distance sensing module 320 may be configured to provide input to processor(s) 332. For instance, perception module 310 may be configured to provide one or more images to processor(s) 332, which may be programmed to detect one or more objects (e.g., boxes) in the provided one or more images. Distance sensing module 320 may be configured to provide information about the environment of the robot located near the surface (e.g., the ground) on which the robot's base is situated. In this way, the distance sensing module 320 may be configured to sense environmental information near the robot that the perception module 310 cannot sense, thereby providing complementary information about the environment to processor(s) 332 for processing and detection of dropped objects, as described in more detail below.

Data storage 334 may be configured to store known surface information 336 describing one or more known surfaces in the environment of the robot. For example, when the robot is tasked with unloading boxes from within a truck and placing them on a conveyor, the known surfaces may include the walls of the truck, a stack of boxes in the truck, and the conveyor located behind the robot. The known surface information 336 may be used to identify dropped objects (e.g., boxes), as described in more detail below. Robotic device 300 may also include robotic servo controllers 340, which may be in communication with processor(s) 332 and may receive control commands from processor(s) 332 to move a corresponding portion (e.g., end effector, omnidirectional drive system) of the robotic device.

During operation, perception module 310 can perceive one or more objects (e.g., parcels such as boxes) for grasping (e.g., by an end-effector of the robotic device 300) and/or one or more aspects of the robotic device's environment. In some embodiments, perception module 310 includes one or more sensors configured to sense the environment. For example, the one or more sensors may include, but are not limited to, a color camera, a depth camera, a LiDAR or stereo vision device, or another device with suitable sensory capabilities. In some embodiments, image(s) captured by perception module 310 are processed by processor(s) 332 to extract surfaces (e.g., faces) of objects in the image capable of being grasped by the robotic device 300.

The perception module 310 of a robotic device may have a limited field-of-view and consequently may not be able to observe some objects located close to the mobile base of the robot on the ground. For instance, the perception mast 140 included as part of the illustrative robot shown in FIGS. 1A and 1B has two perception modules 142, each of which includes a plurality of sensors (e.g., one or more cameras and/or depth sensors) for capturing information about the environment of the robot. The orientation of the sensors in each of the perception modules 142 may be fixed or variable. In the example of FIGS. 1A and 1B, the two perception modules 142 have fixed but different orientations. The upper perception module has an orientation fixed at 0° (straight ahead) to be able to see, for example, a tall stack of objects (e.g., boxes) located directly in front of the robotic device. The lower perception module is oriented downward (e.g., by) 15° to be able to see objects closer to the ground. Although the lower perception module may be capable of detecting objects a distance away from the mobile base of the robot, the field of view of the lower perception module is occluded near the mobile base of the robot such that objects located on the ground may not be observable by the lower perception module. For instance, the field of view may be occluded by parts of the robot itself including the arm of the robot and the mobile base or attachments coupled to or located near the robot such as a conveyor as shown in FIG. 2B.

As discussed above, some mobile robotic devices include a plurality of distance sensors (e.g., LiDAR sensors) located on the mobile device of the robotic device to facilitate navigation and to ensure that the robot travels safely in its environment. The inventors have recognized that the output of the distance sensors may also be used to detect objects located near the base of the robotic device, for example, when the robot is stationary while performing a task, such as grasping objects from a stack. In particular, the inventors have recognized that the relatively high-resolution information (e.g., color images and corresponding depth information) captured by the perception modules of the robot, which is helpful to identify objects to be grasped by the robot, may not be needed to identify that an object is located near the base of the robot. Rather, the relatively lower-resolution information (distance-based point clouds) sensed by the distance sensors located on the base of the robotic device may be used to detect such objects, e.g., if some assumptions about the environment and characteristics of likely objects located near the robot (e.g., a size or shape of dropped boxes) are used to filter the sensed distance-based information. Additionally, use of the distance sensor information enables the robotic device to detect possible dropped objects without having to interrupt the normal picking cycle of the robotic device, which provides for overall faster operation of the robotic device with less downtime spent investigating possible dropped objects.

Figure 4:
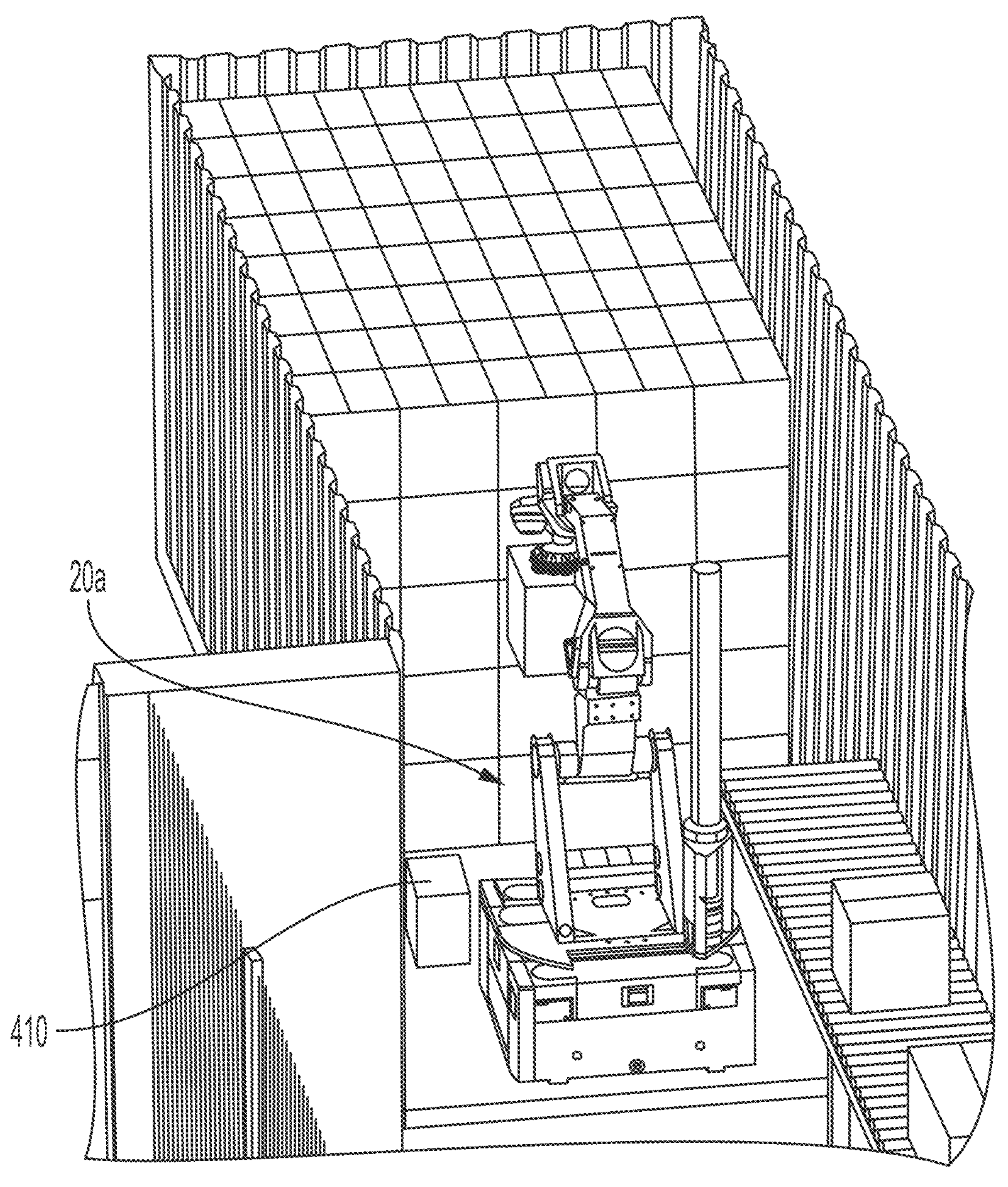
FIG. 4 depicts an illustrative scenario in which an object has been dropped in a location near a robot in accordance with some embodiments.

FIG. 4 depicts a scenario in which an object 410 has been dropped by robotic device 20*a* and is located near the base of the robotic device out of the field of view of the perception modules of the robotic device. Although shown as being located near the front left of the robotic device, it should be appreciated that the techniques described herein may be used to detect objects on all sides of the robotic device.

Figure 5:
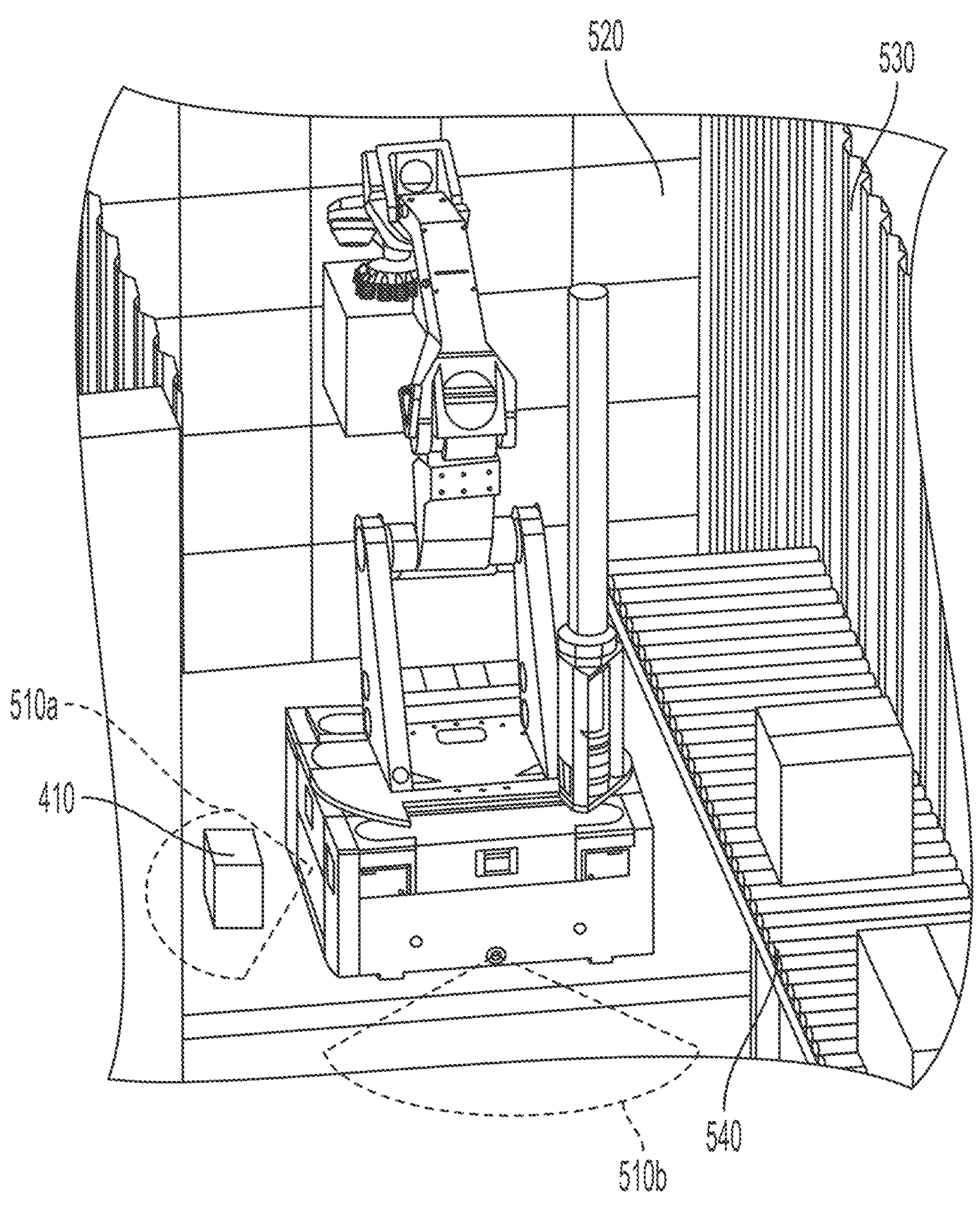
FIG. 5 depicts the use of onboard distance sensors arranged in a base of a robot to identify a dropped object in accordance with some embodiments.

FIG. 5 schematically illustrates the scenario depicted in FIG. 4 in which the object 410 is within a field of view 510*a* of a distance sensor located on a left side of the mobile base of the robotic device. As shown, distance sensors located on the other sides of the mobile base have corresponding fields-of view (e.g., field of view 510*b*). Although not shown as overlapping in FIG. 5, it should be appreciated that the distance sensors located on different sides of the mobile robot may be arranged to have overlapping fields of view as shown, for example, in FIG. 2D.

Figure 6:
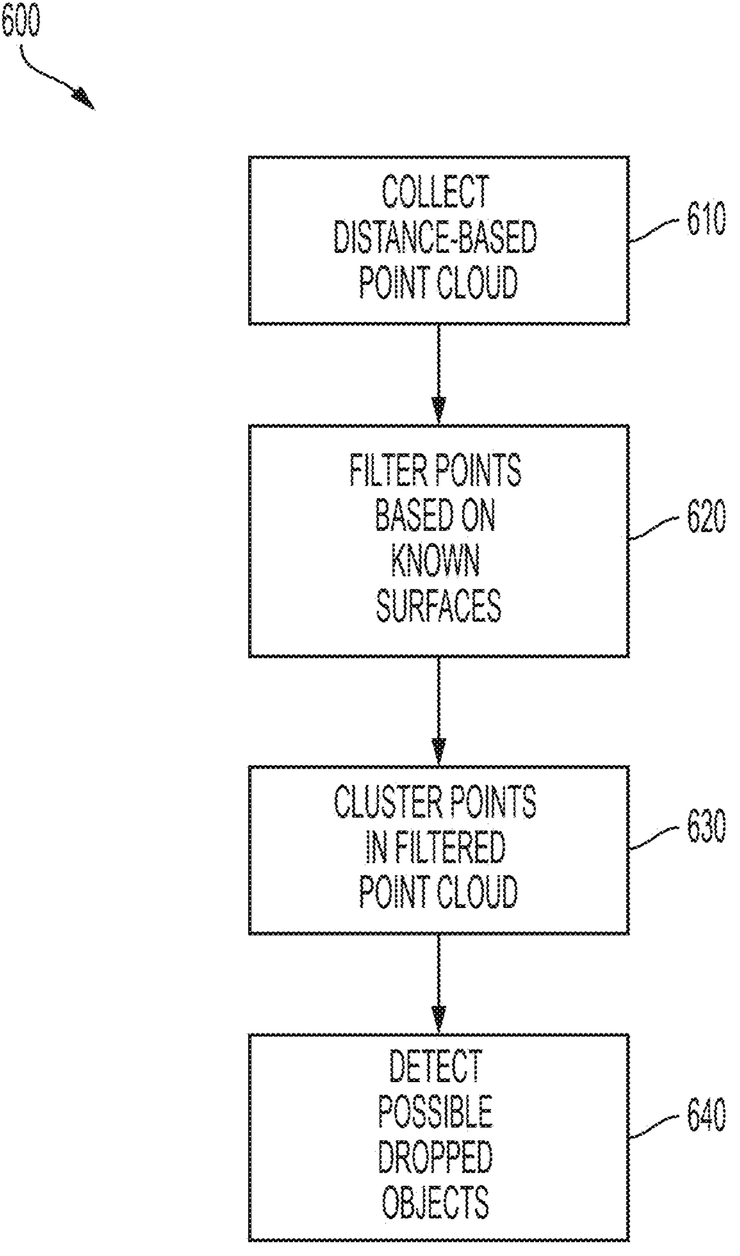
FIG. 6 is a flowchart of a process for identifying possible dropped objects in accordance with some embodiments.

FIG. 6 illustrates a flowchart of a process 600 for detecting possible dropped objects located near the base of a robotic device in accordance with some embodiments. Process 600 begins in act 610, where a distance-based point cloud is collected using a plurality of distance sensors arranged on the base of the robotic device. For instance, as shown in FIG. 2D, described above, the robotic device may include a distance sensor on each of the sides of the base of the robot to provide essentially a 360° field-of-view of objects located around the base of the robotic device.

Because the information in the distance-based point cloud only includes a rough model of the environment about the objects in the environment (e.g., that an object may exist), but does not include any information about the identity of the detected objects, inferences can be made to determine which points in the distance-based point cloud are associated with possible objects located on the ground and which points are less likely to correspond to a dropped object. To facilitate this determination, process 600 proceeds to act 620, where the set of points in the distance-based point cloud is filtered based on information about known surfaces in the environment of the robotic device. When the robotic device is performing a task in a known environment, such as unloading stacked boxes from a truck onto a conveyor as shown in FIG. 5, information about the known surfaces in the environment may be stored in data storage of the computing architecture of the robotic device, as described above in connection with FIG. 3. Information about the known surfaces in the robot's environment may be used to filter the points in the distance-based point cloud by removing points corresponding to the known surfaces. For example, in the example shown in FIG. 5, known surfaces may include a front surface of a stack of boxes 520 located in front of the robotic device, the walls 530 of the truck and a surface associated with the conveyor 540 on which boxes are being placed by the robotic device. In other scenarios, the set of known surfaces may be different. For example, when the robotic device is working in an aisle of a warehouse, the known surfaces may include the shelves located on either side of the aisle, the walls of the warehouse, a cart or other accessory coupled to the robotic device and/or any already-detected known boxes in the environment of the robotic device.

The output of act 620 of process 600 can be a filtered distance-based point cloud in which points corresponding to known surfaces in the environment have been removed from the sensed distance-based point cloud. Process 600 then proceeds to act 630 where the remaining points in the filtered distance-based point cloud are clustered to separate points that correspond to possible dropped objects from other points that may have been detected due to reasons other than possible dropped objects (e.g., due to distance sensor noise, dust particles in the environment, etc.). Any suitable point clustering technique may be used in act 630 to generate a set of point clusters. For instance, in some embodiments, a region growing technique is used, in which a "seed" point in the filtered distance-based point cloud is selected and neighboring points in the point cloud within a certain distance of the seed point are combined into a region of the point cloud thereby forming a point cluster. The point cluster can continue to be expanded in three dimensions in an iterative manner with more and more neighboring points in the point cloud being added to the point cluster according to the distance criterion. After one point cluster has been formed, a different seed point in the filtered-distance-based point cloud can be selected and the clustering process can be repeated. It should be appreciated that point clusters can be identified in serial, in parallel, or any combination of serial and parallel. Other point clustering techniques include, but are not limited to, using a Hough transform to extract lines in the filtered distance-based point cloud.

The output of act 630 can be a set of point clusters from the filtered distance-based point cloud. Process 600 then proceeds to act 640, where the point clusters are further processed to determine which point clusters may correspond to a possible dropped object and which point clusters likely do not correspond to a dropped object. In some embodiments, one or more heuristics are applied to one or more characteristics of the point clusters to facilitate the determination of which point clusters correspond to possible dropped objects and which do not. For instance, point clusters having fewer than a threshold number of points (e.g., less than 10 points, less than 5 points, less than 2 points) may be removed from the set of point clusters corresponding to possible dropped objects. Other criteria may additionally or alternatively be applied to the point clusters, such as whether the point clusters have dimensions (e.g., width/length/height or some combination of width, length and/or height) less than a particular dimension. Whether point clusters have a shape different than an expected shape of dropped objects may also be used to remove point clusters from the set of point clusters that correspond to possible dropped objects. An example with regard to a shape constraint in a scenario where the robotic device is in the process of picking rectangular boxes from a stack of boxes in a truck is that the point cluster have rectangular features to remain included in the set of point clusters that correspond to possible dropped objects, whereas point clusters having curved or spherical shapes are removed from the final set of point clusters. Determining that a point cluster has rectangular or approximately rectangular features may be determined in any suitable way. As an example, the point cluster may be determined to be rectangular or approximately rectangular when the points in the cluster lie on a small number of lines. As another example, the point cluster may be determined to be rectangular or approximately rectangular when a rectangle fit to the points in the cluster has a fit that is above a particular threshold. In some embodiments, time-based constraints may be used to evaluate whether point clusters correspond to possible objects. For instance, if the shape of the point cluster remains consistent over a certain period of time (e.g., 5 seconds), the point cluster may be determined to likely correspond to an object rather than something that is transient such as noise or dust. It should also be appreciated that actions 630 and 640 may operate together, such that when a point cluster is formed in act 630, one or more criteria may be applied in act 640 to the formed point cluster to assess whether it should be retained or removed from the set of point clusters.

The output of act 640 is a set of possible objects that may have been dropped on the ground near the robot. In response to detecting the possible objects, one or more of the robotic servo controllers of the robotic device may be controlled to attempt to pick up the dropped object. If the location of the dropped object is within the reach of the end-effector of robotic device, the robotic device may be controlled to pick up the dropped object without moving its mobile base. Alternatively, the robotic device may be controlled to drive (e.g., by controlling an omnidirectional drive system) in a direction that enables the robotic device to capture an image of the possible dropped object with a perception module of the robotic device prior to attempting retrieval of the dropped object. Capturing an image of the dropped object with the perception module of the robotic device may provide for safer operation of the robot as the possible object can be verified as a dropped object prior to attempting to grasp it. In some embodiments, an omnidirectional drive system of the robotic device may be controlled to drive away from a stack of objects that the robotic device is currently interacting with until the perception module of the robotic device can capture an image of the dropped object. If it is not possible for the robotic device to safely drive to a location to capture an image of the possible dropped object (e.g., because the possible dropped object is located directly behind the robot), an indication that the robotic device has detected a possible dropped object may be provided to an operator or another robotic device to assist with the retrieval of the possible dropped object. If multiple possible objects are detected near the robotic device, the robotic device may be controlled to drive to a position where all of the possible dropped objects can be identified by capturing image(s) of the possible dropped objects prior to attempting to retrieve them.

Although illustrated as separate elements, the modules described and/or illustrated herein may represent portions of a single module or application. In addition, in certain embodiments one or more of these modules may represent one or more software applications or programs that, when executed by at least one computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that embodiments of a robot may include at least one non-transitory computer-readable storage medium (e.g., a computer memory, a portable memory, a compact disk, etc.) encoded with a computer program (i.e., a plurality of instructions), which, when executed on a processor, performs one or more of the above-discussed functions. Those functions, for example, may include control of the robot and/or driving a wheel or arm of the robot. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A method comprising:

capturing, by at least one first sensor, an image of a stack of objects arranged near a robotic device;

receiving, by at least one computing device, a distance-based point cloud including a plurality of points in three dimensions, the plurality of points including points corresponding to one or more objects not included in the stack of objects, wherein the distance-based point cloud corresponds to sensor data captured by at least one second sensor arranged to sense objects in multiple directions around a location of the robotic device;

filtering, by the at least one computing device, the distance-based point cloud to remove points from the plurality of points based on at least one known surface of an environment of the robotic device to produce a filtered distance-based point cloud;

clustering, by the at least one computing device, points in the filtered distance-based point cloud to produce a set of point clusters;

detecting, by the at least one computing device, the one or more objects based, at least in part, on the set of point clusters; and controlling the robotic device to grasp at least one of the detected one or more objects.

2. The method of claim 1, wherein the distance-based point cloud includes points in the environment of the robotic device that surround the robotic device.

3. The method of claim 1, wherein the at least one known surface includes one or more of a wall of an enclosure of the environment of the robotic device, a surface corresponding to the stack of objects arranged near the robotic device, or a surface associated with an accessory located near and/or coupled to the robotic device.

4. The method of claim 3, wherein the accessory comprises a conveyor onto which the robotic device is configured to place objects.

5. The method of claim 1, wherein the at least one known surface comprises a wall of an enclosure of the environment of the robotic device, a surface corresponding to the stack of objects arranged near the robotic device, and a surface associated with a conveyor on which the robotic device is configured to place objects.

6. The method of claim 1, wherein clustering points in the filtered distance-based point cloud to produce a set of point clusters comprises using a region growing technique to determine that points in the filtered distance-based point cloud should be formed into a cluster when the points are less than a threshold distance from each other.

7. The method of claim 1, wherein detecting the one or more objects based, at least in part, on the set of point clusters comprises:
for each point cluster in the set of point clusters:
determining at least one characteristic of the point cluster; and
determining that the point cluster represents an object of the one or more objects when the at least one characteristic is associated with one or more known objects in an environment of the robotic device.

8. The method of claim 7, wherein the at least one characteristic includes one or more of a dimension of the point cluster, a number of points in the point cluster, or a shape of the point cluster.

9. The method of claim 7, wherein the at least one characteristic includes multiple characteristics including two or more of a dimension of the point cluster, a number of points in the point cluster, or a shape of the point cluster.

10. The method of claim 7, wherein the one or more known objects in an environment of the robotic device includes rectangular boxes and wherein the point cluster is determined to be one or more objects when a shape of the point cluster is rectangular or approximately rectangular.

11. The method of claim 7, further comprising:
removing a point cluster from the set of point clusters when it is determined that the at least one characteristic is not associated with one or more known objects in the environment of the robotic device and/or when it is determined that a number of points in the point cluster is less than a threshold amount.

12. The method of claim 1, wherein the robotic device is configured to repeatedly grasp objects from a stack of objects, and wherein the one or more objects are detected without interrupting the repeated grasping operation of the robotic device.

13. The method of claim 1, wherein the one or more objects are detected without observing the one or more objects with a camera.

14. The method of claim 1, further comprising:
controlling the robotic device to drive to a location where the detected one or more objects are within a first field of view of the at least one first sensor;
controlling the at least one first sensor to capture at least one image of the detected one or more objects; and
controlling the robotic device to grasp the detected one or more objects based on the captured at least one image of the detected one or more objects.

15. The method of claim 14, wherein controlling the robotic device to drive to a location where the detected one or more objects are within the first field of view of the at least one first sensor comprises controlling the robotic device to drive away from the stack of objects until the detected one or more objects are within the first field of view of the at least one first sensor.

16. A mobile robotic device, comprising:
at least one first sensor configured to capture an image of a stack of objects arranged near the mobile robotic device;
at least one second sensor arranged on a base of the robotic device to sense objects in multiple directions around a location of the robotic device, wherein the at least one second sensor is configured to collect a distance-based point cloud including a plurality of points in three dimensions, the plurality of points including points corresponding to one or more objects not included in the stack of objects;
at least one storage device configured to store information about at least one known surface of an environment of the robotic device;
an end effector configured to grasp objects in the environment of the robotic device; and
at least one computing device configured to:
filter the distance-based point cloud to remove points from the plurality of points based on the information about the at least one known surface to produce a filtered distance-based point cloud;
cluster points in the filtered distance-based point cloud to produce a set of point clusters;
detect the one or more objects based, at least in part, on the set of point clusters; and
control the end effector to grasp at least one of the detected one or more objects.

17. The mobile robotic device of claim 16, wherein the at least one second sensor comprises a plurality of distance sensors, each distance sensor of the plurality of distance sensors arranged on a different side of the base of the robotic device, and wherein the distance-based point cloud includes points in the environment of the robotic device that surround the robotic device.

18. The mobile robotic device of claim 16, wherein the one or more objects are detected without interrupting the repeated grasping operation of the robotic device.

19. The mobile robotic device of claim 16, wherein the one or more objects are detected without observing the one or more objects using the at least one first sensor.

20. The mobile robotic device of claim 16, further comprising:
an omnidirectional drive system,
wherein the at least one computing device is further configured to control the omnidirectional drive system to drive the robotic device to a location where the detected one or more objects are within a first field of view of the at least one first sensor.

21. The mobile robotic device of claim 20, wherein the at least one computing device is further configured to:
control the at least one first sensor to capture at least one image of the detected one or more objects; and
control the end effector of the robotic device to grasp the detected one or more objects based on the captured at least one image of the detected one or more objects.

22. The mobile robotic device of claim 21, wherein controlling the omnidirectional drive system of the robotic device to drive to a location where the detected one or more objects is within the first field of view of the at least one first sensor comprises controlling the robotic device to drive away from a stack of objects that the robotic device is configured to interact with until the detected one or more objects is within the first field of view of the at least one first sensor.

23. A non-transitory computer-readable medium encoded with a plurality of instructions that, when executed by at least one computing device, perform a method comprising:
receiving, from at least one first sensor, an image of a stack of objects arranged near a robotic device;
receiving a distance-based point cloud including a plurality of points in three dimensions, the plurality of points including points corresponding to one or more objects not included in the stack of objects, wherein the distance-based point cloud corresponds to sensor data captured by at least one second sensor arranged to sense objects in multiple directions around a location of the robotic device;

filtering the distance-based point cloud to remove points from the plurality of points based on at least one known surface of an environment of the robotic device to produce a filtered distance-based point cloud;

clustering points in the filtered distance-based point cloud to produce a set of point clusters;

detecting the one or more objects based, at least in part, on the set of point clusters; and controlling the robotic device to grasp at least one of the detected one or more objects.

* * * * *